J. Kepler.
Churn.
Nº 78,626. Patented Jan. 2, 1868.
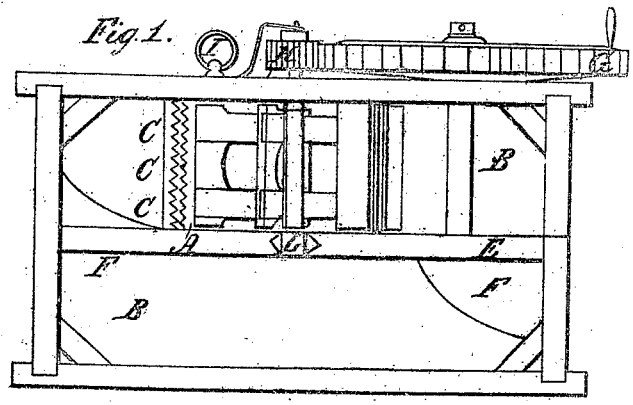
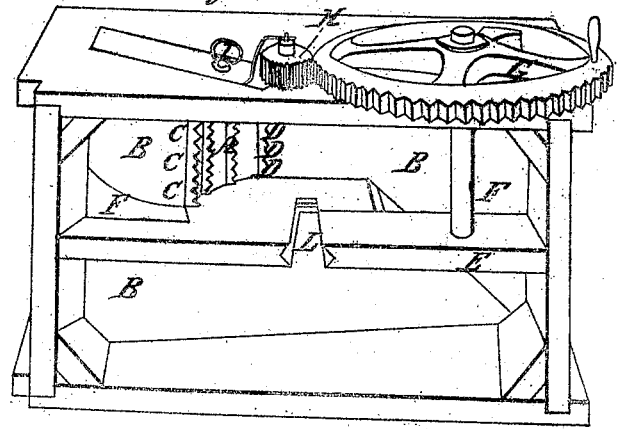
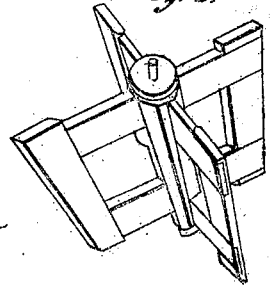
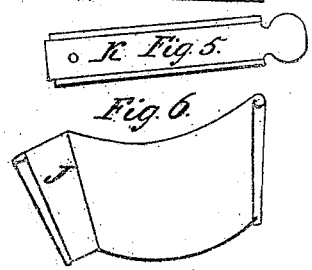
Witnesses
Wilson H. Layman
P. F. Kennedy
Inventor
Joseph Kepler

United States Patent Office.

JOSEPH KEPLER, OF CRAWFORDSVILLE, INDIANA.

*Letters Patent No. 78,526, dated June 2, 1868.*

---

IMPROVEMENT IN CHURNS.

---

The Schedule referred to in these Letters Patent and making part of the same.

---

TO ALL WHOM IT MAY CONCERN:

Be it known that I, JOSEPH KEPLER, of the city of Crawfordsville, in Montgomery county, and State of Indiana, have invented a new and useful Improvement in Churns; and I do hereby declare that the following is a full, clear, and exact description thereof, which will enable those skilled in the art to make and use the same, reference being had to the accompanying drawings, and to the letters of reference marked thereto, forming part of this specification.

The nature of my invention consists in such an arrangement of mechanical powers or devices as to enable milk to be churned into butter in a few minutes, extracting all the butter from the milk, and depositing the butter separate and apart from the milk.

My machine is so constructed as to be operated in the most effective manner, with a very slight exertion of force, whilst the operative parts can be removed in a few moments whenever it is desirable.

To enable others skilled in the art to make and use my invention, I will proceed to describe its construction and operation.

Figure 1 represents a top view of churn when open.

Figure 2 represents side elevation with the churn open.

Figure 3 represents the dash-wheel.

Figure 4 represents the top removed from the churn.

Figure 5 represents the sliding key, for holding the end of the dash when placed in position.

Figure 6 represents the cover of zinc to confine the milk from splashing when in action.

Similar figures and letters indicate like parts.

A, in fig. 1, is a concave breast, shielded with metallic points of zinc.

B is the bottom of the churn-box, which is in the form of a scroll, elevated in the middle, and forming a descent from C C C to D D D, of about four inches, this giving a current from the dash at the breast of the churn.

E is the portion which is perforated at F F, to allow the flow of the milk from the breast C to the concave A.

Fig. 2, letter A, shows the concave breast with the dash removed; letter G, the main wheel; letter H, pinion-wheel, communicating with the dash-wheel by a socket-joint to communicate the velocity required. Letter I is a spring-catch and screw, to retain the pinion-wheel H in place during the operation of churning.

Fig. 5 is a key, K, formed of the dash-shaft, and is fitted into a groove in partition E, so as to remove the dash-wheel at pleasure.

The advantages claimed for my machine are, that the milk acted upon by the dash, fig. 3, is forced against the concave, letter A, in figs. 1 and 2, and forced over the breast C, then around from these along the concavo-convex bottom, B B B, around, to be again acted upon by the dash-wheel. Only a part of the milk, therefore, is operated upon at a time, and the dash-wheel not only turns easier than it otherwise would, but the particles of milk are more thoroughly acted upon, and presented to the breaking-up power of the zinc teeth in the concave A.

To use the churn, place the dash, fig. 3, in the concave slide, put fig. 5 in slot L, figs. 1 and 2, fastening pinion-wheel H by screw I; place on the zinc top, fig. 6; pour in your milk, put on top, fig. 4, and turn the wheel G.

Having thus explained and described my invention, what I claim, and desire to secure by Letters Patent, is—

The device of a single concave breast, with metal points, the convex-concave bottom B descending from the elevated breast C, through the openings F F, figs. 1 and 2, in combination with perforated top M, in fig. 4, dash, fig. 3, and scroll-top, fig. 6, enclosed in a box, substantially as herein set forth.

The foregoing specification of my invention signed by me, this nineteenth day of February, A. D. 1868.

JOSEPH KEPLER.

Witnesses:
A. W. LEMMON,
WILSON H. LAYMON.